United States Patent [19]

Sacco et al.

[11] Patent Number: 4,805,962
[45] Date of Patent: Feb. 21, 1989

[54] SEAT SHELL FOR A MOTOR VEHICLE SEAT

[75] Inventors: Bruno Sacco; Josef Gallitzendörfer, both of Sindelfingen; Michael V. Klein, Bondorf; Gerhard Janz, Rohrau; Alfred Ernst, Weil der Stadt, all of Fed. Rep. of Germany

[73] Assignee: Daimler-Benz Aktiengesellschaft, Fed. Rep. of Germany

[21] Appl. No.: 400,255

[22] Filed: Jul. 21, 1982

[30] Foreign Application Priority Data

Jul. 23, 1981 [DE] Fed. Rep. of Germany ....... 3129073

[51] Int. Cl.⁴ .......................... B60N 1/00; B60N 3/02
[52] U.S. Cl. .................................. 297/454; 297/183; 297/457; 297/DIG. 2
[58] Field of Search ........................ 297/454, 457–460, 297/DIG. 2, 183, 452

[56] References Cited

U.S. PATENT DOCUMENTS

| 2,952,306 | 9/1960 | Adler | 248/188.91 X |
| 3,101,972 | 8/1963 | Laughlin | 297/457 |
| 3,147,997 | 9/1964 | Mason | 297/457 X |
| 3,174,799 | 3/1965 | Haltenberger | 297/403 |
| 4,375,902 | 3/1983 | Tai et al. | 297/408 |

FOREIGN PATENT DOCUMENTS

| 2551978 | 5/1976 | Fed. Rep. of Germany | 297/457 |
| 2345309 | 10/1977 | France | 297/457 |
| 593041 | 11/1977 | Switzerland | 297/219 |
| 1435692 | 5/1976 | United Kingdom | 297/DIG. 2 |

Primary Examiner—Peter R. Brown
Attorney, Agent, or Firm—Barnes & Thornburg

[57] ABSTRACT

A seat shell for a motor vehicle seat which includes a channel extending along each lateral edge of the seat shell from a front of the seat shell to a top of a back portion of the seat shell. The channel is provided with fittings for receiving fasteners. To increase the strength and ensure easy fastening of the fittings, the channel projects from a rear side of the seat shell and receives the fittings in a bottom portion thereof. The channel is closed on a front side of the seat shell in such a manner so as to form a continuous surface therewith.

16 Claims, 6 Drawing Sheets

SEAT SHELL FOR A MOTOR VEHICLE SEAT

BACKGROUND OF THE INVENTION

The present invention relates to a seat shell and, more particularly, to a seat shell for a motor vehicle which has a channel formed therein extending around each lateral edge of the seat from a front of the seat to a top of a backrest portion of the seat, and which is provided with fittings for receiving fastening means.

In, for example, German Auslegeschrift No. 1,055,977, a seat shell of the aforementioned type is proposed wherein each channel forms a respective edge closure of the seat shell and is open at the bottom thereof. While this arrangement provides good lateral guidance during a cornering of the motor vehicle and the transmission of forces occurring in normal travel through edge regions, a disadvantage of this proposed seat shell arises when such a seat shell is utilized for accommodating safety belt fastening points and/or is used in an omnibus wherein the seat backs are usually very tall and form long lever arms due to the fact that the strength of the seat shell is no longer sufficient.

A further disadvantage of the prior known seat shell resides in the fact that, with the channel being open at the bottom, it is necessary for the fittings to be attached to inner walls of the channel, thereby increasing the overall cost of assembly of the motor vehicle seat.

SUMMARY AND OBJECTS OF THE INVENTION

The aim underlying the present invention essentially resides in providing a seat shell generally of the aforementioned type wherein the strength of the seat shell is greatly increased without a corresponding increase in the total weight of the seat shell and which makes it possible for fittings to be easily attached so that the seat shell may be fastened as a preassembled unit.

In accordance with advantageous features of the present invention, a seat shell for a motor vehicle is provided wherein a channel projects from a rear side of the seat shell includes fittings in a bottom of the channel, and is closed on a front side of the seat shell so as to form a continuous surface therewith.

By virtue of the above-noted constructional features of the present invention, it is possible for attachment and fastening components to be fastened in such a manner so as to be supported on an outside of the channel, while the fittings do not require special fastening.

Moreover, by virtue of the construction of channels having their front sides closed, a flexurally and torsionally rigid seat shell results which is capable of taking on heavy forces.

Advantageously, when the seat shell is not upholstered, a cover may be provided which may contrast in color with the seat shell.

In order to achieve a still greater loadability or strength of the seat shell, the cavity or opening defined in the channels may be closed by a cover with the cavity being filled with a foam.

In accordance with still further advantageous features of the present invention, the channel may include a core formed, for example, of a rigid foam, which core, during a manufacturing process, is enclosed by the material of the seat shell, thereby eliminating any separate closing operation for the channel.

If, for example, the core is provided with fittings, it would, in accordance with the present invention, be easily possible for attachment parts to be fitted at a later time because the fittings will be firmly secured in position. This will also be the situation if the fittings are fixed during a fastening of the cover by, for example, suitable formation of a rear side of the cover.

If each channel is bounded on an outside thereof by a rim projecting therefrom, in accordance with the present invention, the rim may be adapted to receive an edging strip which conceals any possible defects of the edge and which, at the same time, may be readily adapted to have an upholstery cover cloth fastened thereto.

With a seat shell in which the seat part is received by a seat support or pedestal which includes at least one tube extending in a transverse direction of the motor vehicle, a simple fastening may be achieved in accordance with the present invention if each channel is provided, in a support region of the tube, with an indentation which corresponds to a diameter of the tube and cooperates with a clip-type pipe fitting on an inside of the channel.

In accordance with yet further features of the present invention, the channel may be provided at an end thereof in an area of the seat back portion of the seat, with a holder which partly embraces each respective channel.

Advantageously, the holder may be in the form of a handle and may extend from one channel to the other.

It is possible, in accordance with the present invention to obtain a greater stability and still achieve a stylistically perfect appearance by connecting, in a top area thereof, the channels to each other by a channel section which extends in a transverse direction of the vehicle, with the channel section being closed in a forward direction of the seat shell.

However, it is also possible in accordance with the present invention, for the holder to be provided with a head rest which extends the seat back in a upward direction, and to which a handle is attached on at least one side.

Accordingly, it is an object of the present invention to provide a seat shell for a motor vehicle which avoids, by simple means, shortcomings and disadvantages encountered in the prior art.

Another object of the present invention resides in providing a seat shell for a motor vehicle seat which is simple in construction and therefore relatively inexpensive to manufacture.

Yet another object of the present invention resides in providing a seat shell for a motor vehicle which has a substantially increased strength as compared to previously proposed seat shells without a greatly increased total weight.

Yet another object of the present invention resides in providing a seat shell for a motor vehicle seat which facilitates the attachment of fittings or other mounting components.

These and other objects, features and advantages of the present invention will become more apparent from the following description when taken in connection with the accompanying drawings which show, for the purpose of illustration only, several embodiments in accordance with the present invention and wherein:

BRIEF DESCRIPTION OF THE DRAWING FIGURES

DETAILED DESCRIPTION OF THE PREFERRED EMBODIMENTS

Figure 1:
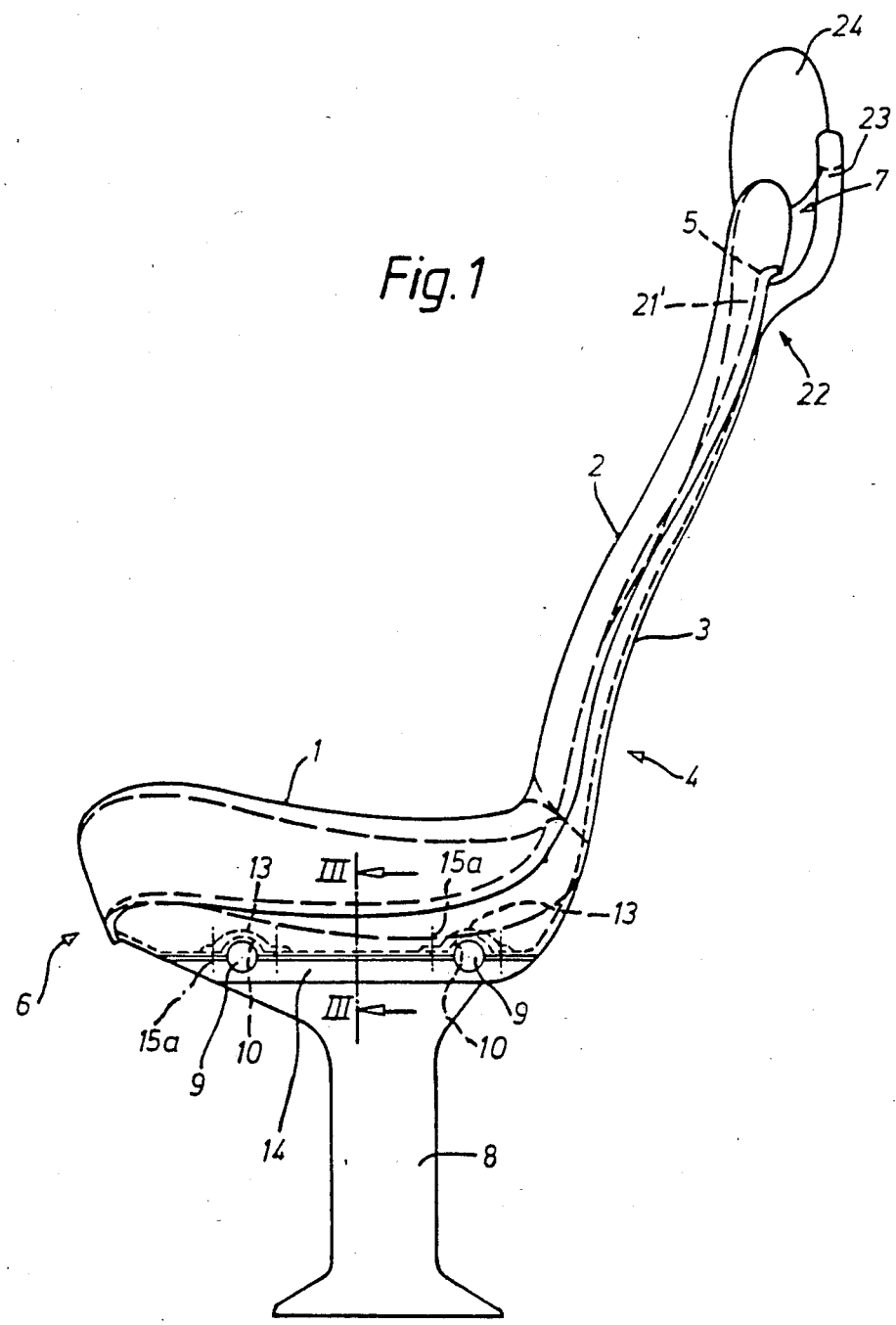
FIG. 1 is a side view of a seat shell constructed in accordance with the present invention mounted on a pedestal.

Referring now to the drawings wherein like reference numerals are used throughout the several views to designate like parts and, more particularly, to FIGS. 1–4, according to these figures, a seat shell 3 includes a seat cushon 1 and a seat backrest cushion 2 supported by means of channels 5. The channels 5 project from a rear side generally designated by the reference numeral 4 of the seat shell 3 and, as shown most clearly in FIGS. 1–3, extend continuously from a front portion generally designated by the reference numeral 6 of the seat cushion 1 to a top portion generally designated by the reference numeral 7 of the seat backrest cushion 2.

Figure 2:
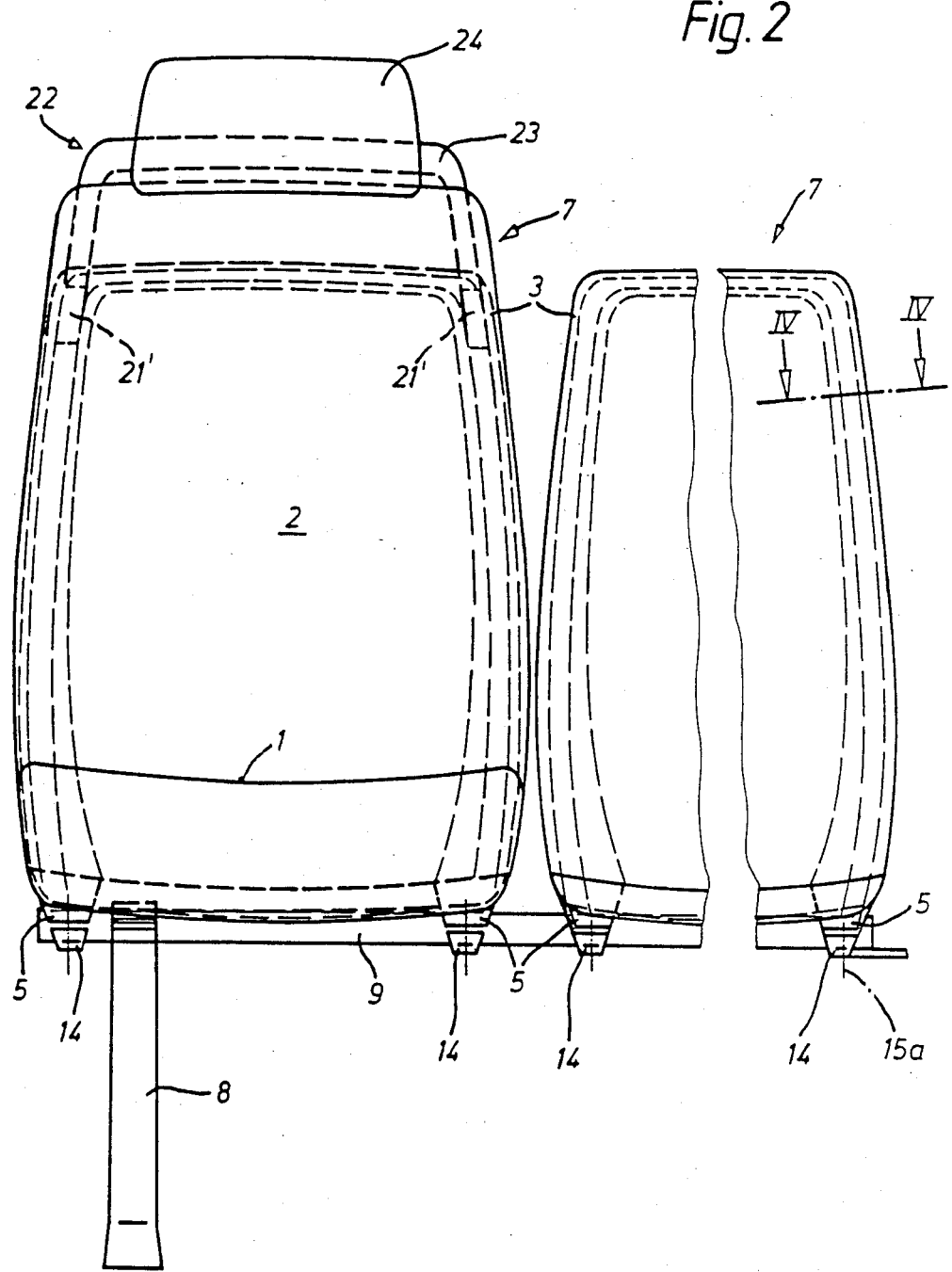
FIG. 2 is a front view of the seat shell of FIG. 1 with an adjacent seat shell of a different construction.

As shown in FIGS. 1 and 2, two tubes 9 are joined to a seat support or pedestal 8 and extending a transverse direction of the vehicle. For the purpose of enabling a fastening of the two tubes 9, the channels 5 are provided with localized indentations 10 (FIG. 1), which generally match the diameter of the tubes 9 and, on an inside 11 of each of the channels 5, clip-type pipe fittings 13 are disposed in a bottom 12 of the channel 5. The clip-type fittings 13 are associated, on the side of the seat support or pedestal 8, with a clamp member 14 adapted to embrace the tubes 9 from below while a fastening means 15a in the form of, for example, bolts or the like, make connections for fixing the positions of the tubes 9 relative thereto.

Figure 3:
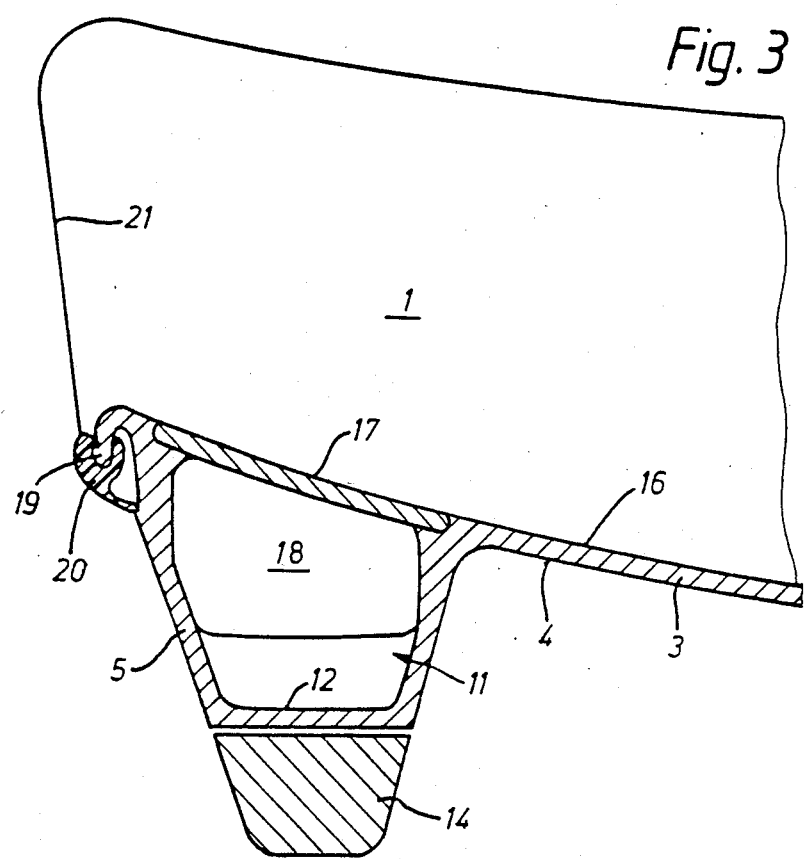
FIG. 3 is a partial cross-sectional view of a portion of the seat shell shown in FIG. 1 taken along line III—III in FIG. 1.
Figure 4:
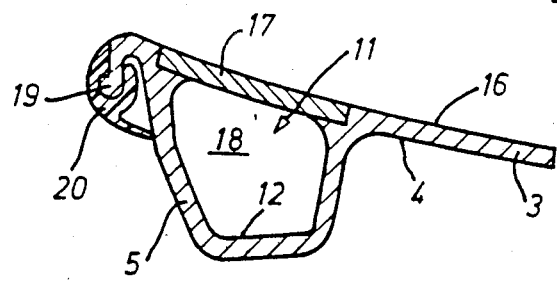
FIG. 4 is a cross-sectional view of a portion of the seat shell shown in FIG. 2 taken along line IV—IV in FIG. 2.

As shown most clearly in FIGS. 3 and 4, the channel 5 is closed at a front side 16 of the seat shell 3 so as to form a continuous surface therewith. The closure of the front of the channels 5 may be effected, in the illustrated manner, by a cover 17, which may be of a different color from that of the seat shell 3. The cover 17 may be joined to the shell 3 in a manner not illustrated in detail in the drawings by, for example, a suitable adhesive, bonding, welding, or clipping. Optionally, the cavity 18 may be filled with a foam in order to increase the strength.

It is also possible, in a manner not illustrated in detail in the drawings, to provide the channel 5 with a core. The core may, for example, be of a rigid foam and provide for fittings 13. Additionally, during a manufacturing of the channel with a core, the channel may be enclosed by the material of the seat shell so that a subsequent closing of the channels 5 would not be required.

As shown in FIGS. 3 and 4, each channel 5 is bounded on the outside by a rim 19, with the rim 19 projecting outwardly and serving to receive a profiled strip 20. In this connection, if the seat shell 3 is not upholstered, as is the case with the right-hand seat in FIG. 2, the sectional strip 20 may be used solely for a stylistically elegant trimming of the rim 19, as shown most clearly in FIG. 4. On the other hand, if the seat shell 3 is to be upholstered as, for example, is the case with the left-hand seat in FIG. 2, the sectional strip 20 serves at the same time as an attachment section for the upholstery covering 21, as shown most clearly in FIG. 3.

Figure 7:
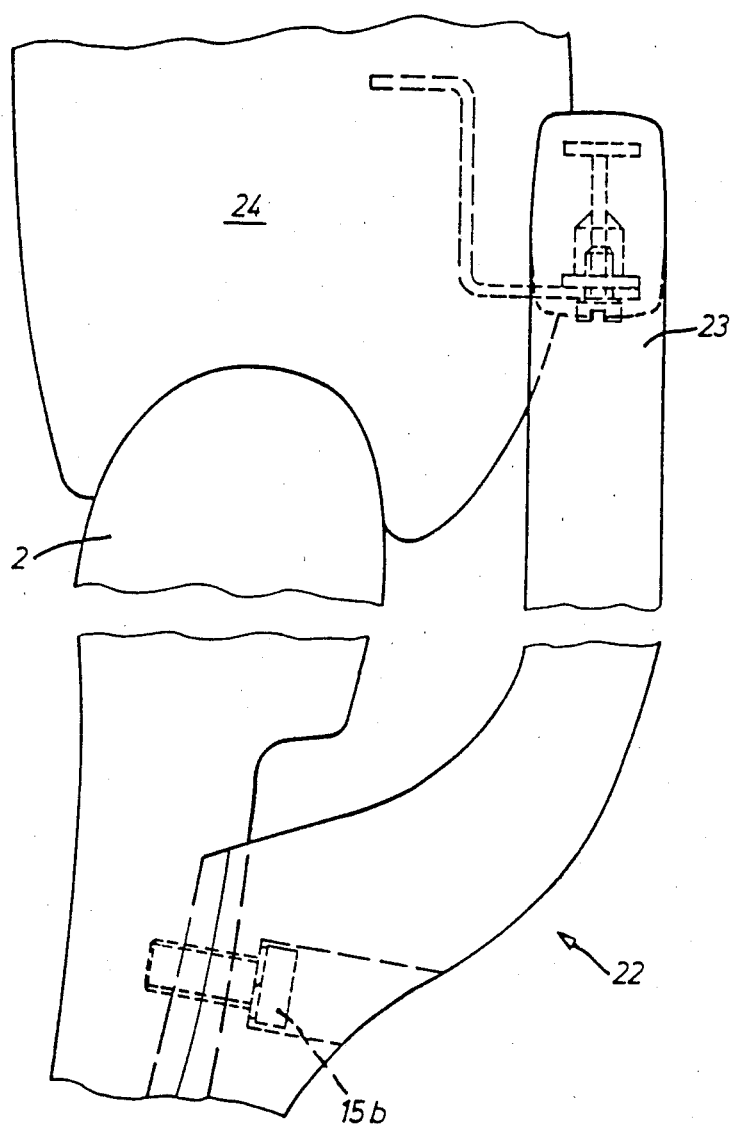
FIG. 7 is a side detail view on an enlarged scale of another holder which in addition to a holding region, is also provided with a head rest extending the back of the seat shell.
Figure 7:
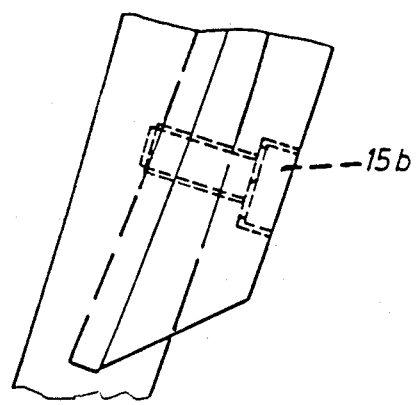

From FIGS. 1 and 2, it can be seen that an upper end 21' of the channels 5 of the seat back cushion 2 are connected with one another at a top area by a channel section which is also closed at the front side 16 of the seat shell 3. The upper end 21' of the channels 5 receives or accommodates a holder generally designated by the reference numeral 22. The holder 22 may be in the form of a handle 23 and be adapted to receive a headrest 24 extending the seat back cushion 2 in a vertical direction, as is shown clearly in FIG. 7. Suitable fasteners such as bolts 15b may be utilized for securing the holder 22 in position.

Figure 5:
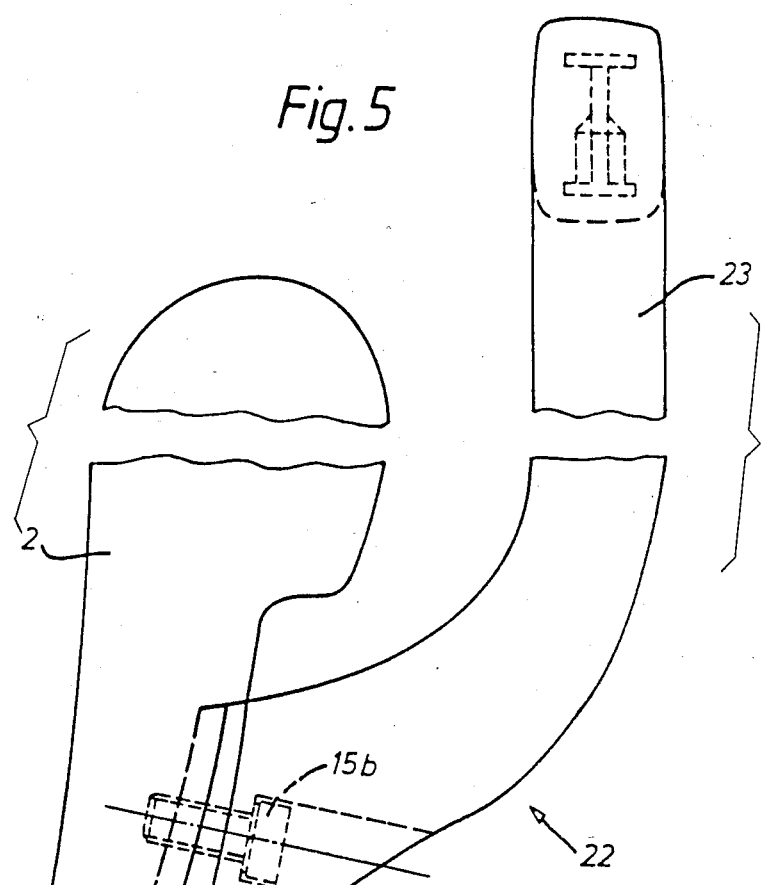
FIG. 5 is a side detail view, on an enlarged scale, in an area of a back end region of a back rest of the seat, with a holder attached thereto.
Figure 6:
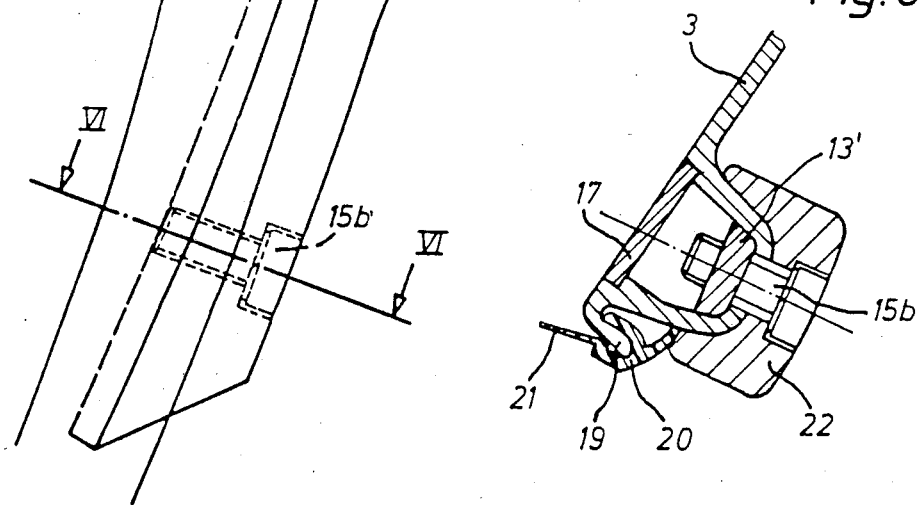
FIG. 6 is a cross-sectional view taken along line VI—VI in FIG. 5.

As shown in FIG. 5, it is possible for the holder 22 to serve solely as a handle 23 which is also disposed only in a region of the associated channel. As shown most clearly in FIG. 6, the holder 22 partially embraces or surrounds the channel 5 so that when the fastening means 15b, adapted to be threadably inserted into a fitting 13', are tightened, accurate fitting contact is made. The fastening operation may be carried out at any time by providing suitable means so as to ensure that the fitting 13' remains in the inserted position. This may be achieved by, for example, the provision of recesses formed in the channel 5.

Figure 8:
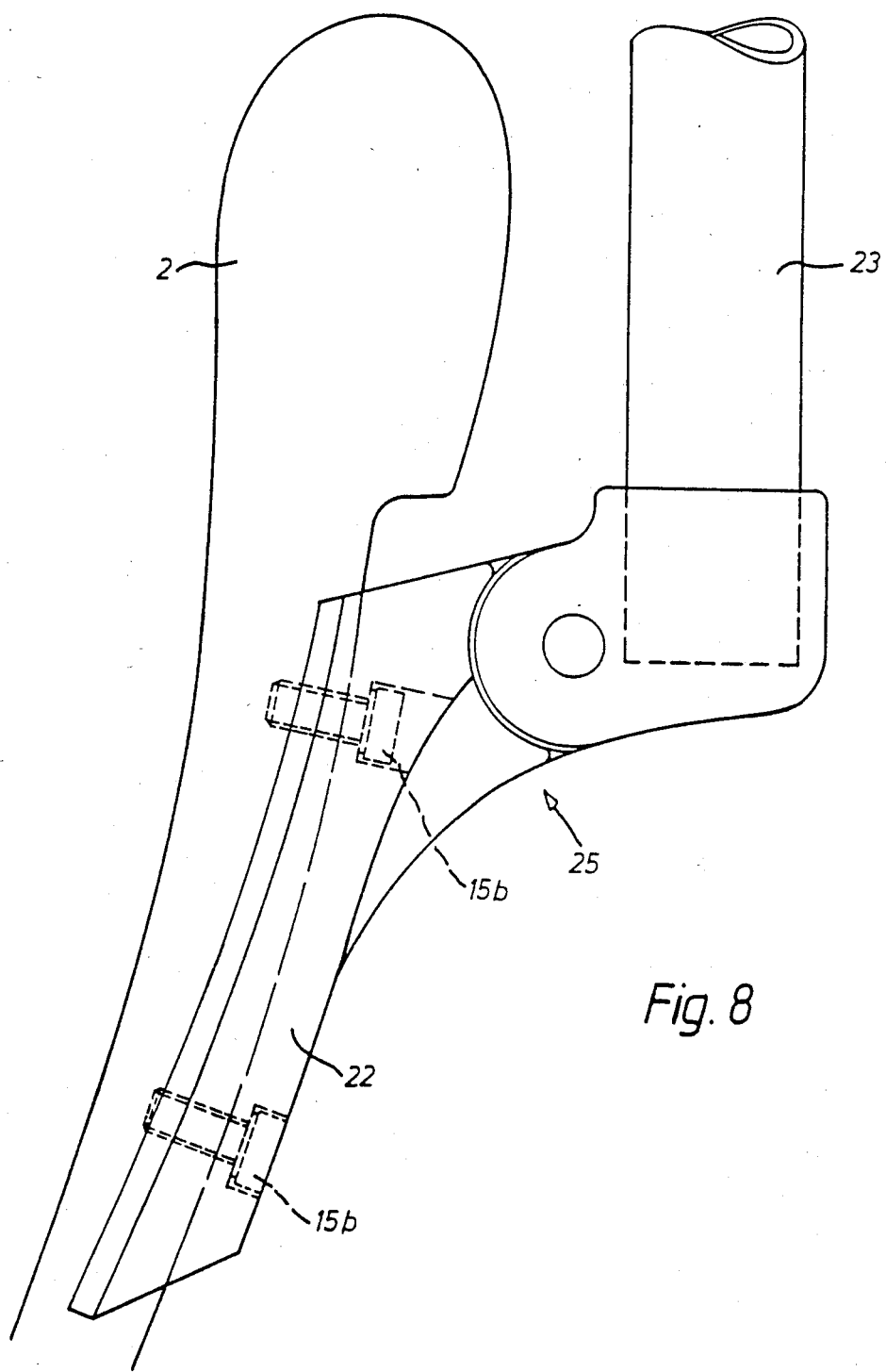
FIG. 8 is a side detail view on an enlarged scale of yet another embodiment of a holder provided with a handle pivotably fastened and supported on two channels.

As shown in FIG. 8, the holder 22 may be provided with a pivot joint generally designated by the reference numeral 25, thereby making it possible to easily fit diverse holding devices.

While We have shown and described several embodiments in accordance with the present invention, it is understood that the same is not limited thereto, but is susceptible of numerous changes and modifications as known to those skilled in the art, and We therefore do not wish to be limited to the details shown and described herein but intend to cover all such changes and modifications as are encompassed by the scope of the appended claims.

We claim:

1. A seat shell for a motor vehicle seat comprising a seat portion, a backrest portion, and continuous channel means extending along each lateral side of th seat shell from a front area of the seat portion to a top area of the backrest portion for supporting the seat portion and backrest portion and for accommodating a plurality of discrete fittings for receiving fastening means, the channel means being disposed so as to project from a rear side of the seat shell and being open toward a front side of the seat shell, said discrete fittings being disposed in the channel means in a manner for cooperating with the fastening means for affixing the seat shell to a support, and fitted over means for closing the channel means and for forming a continuous surface with the front side of the seat shell.

2. A seat shell according to claim 1, wherein means are provided for holding the cover means in place.

3. A seat shell according to claim 1, wherein the cover means contrasts in color with the seat shell.

4. A seat shell according to claim 1, wherein a foam material is provided in the channel means.

5. A seat shell according to claim 1, wherein the channel means includes a core disposed therein.

6. A seat shell according to claim 5, wherein the plurality of discrete fittings are provided in the bottom of the channel means.

7. A seat shell according to one of claims 1, 4, or 5, wherein an outwardly projecting rim means is provided on an outer surface of each of the channel means.

8. A seat shell according to one of claims 1, 5 or 6, wherein the seat shell is adapted to be mounted on a seat support of a motor vehicle, the seat support including at least one tube means extending in a transverse direction of the motor vehicle for engagement by the channel means, an indentation means being provided in each of the channel means for accommodating the at least one tube means, the indentation means having a diameter substantially corresponding to a diameter of the tube means and cooperating with at least one of the plurality of discrete fittings inside the channel means for mounting the seat shell to the seat support.

9. A seat shell according to claim 8, wherein the seat shell includes holder means at an upper end of the backrest portion of the seat shell for supporting a headrest means, the holder means being disposed so as to at least partially surround the channel means.

10. A seat shell according to claim 9, wherein the holder means is fashioned as a handle.

11. A seat shell according to claim 10, wherein the handle extends from a channel means along one lateral side of the seat shell to a channel means along the other lateral side of the seat shell.

12. A seat shell according to claim 9, wherein headrest means are provided for extending the backrest portion, the headrest means extends upwardly from the backrest portion of the seat shell, the headrest means being attached to the holder means on at least one side of the headrest means.

13. A seat shell according to claim 9, wherein the holder means includes pivotal joint means for enabling a mounting of diverse holding means.

14. A seat shell according to claims 1, 4, or 5, wherein holder means are provided at an upper end of the backrest portion of the seat shell for supporting a headrest means, the holder means being disposed so as to at least partially surround the channel means.

15. A seat shell according to claim 14, wherein headrest means are provided for extending the backrest portion, the headrest means extends upwardly from the backrest portion of the seat shell, the headrest means being attached to the holder means on at least one side of the headrest means.

16. A seat shell according to one of claims 1, 4 or 5, wherein further channel means are provided for connecting the channel means extending along each lateral side of the seat shell to each other, the further channel means extending in a transverse direction of a motor vehicle and being closed by said cover means in a forward direction of the seat shell.

* * * * *